(12) United States Patent
Chang

(10) Patent No.: US 7,494,744 B2
(45) Date of Patent: Feb. 24, 2009

(54) CATHODE MATERIAL FOR LI-ION BATTERY APPLICATIONS

(75) Inventor: Chun-Chieh Chang, Ithaca, NY (US)

(73) Assignee: Changs-Ascending Enterprise Co., Taichung (TW)

(*) Notice: Subject to any disclaimer, the term of this patent is extended or adjusted under 35 U.S.C. 154(b) by 435 days.

(21) Appl. No.: 11/371,259

(22) Filed: Mar. 8, 2006

(65) Prior Publication Data

US 2007/0212606 A1 Sep. 13, 2007

(51) Int. Cl.
  *H01M 4/58* (2006.01)
  *H01M 4/00* (2006.01)
  *C01B 25/26* (2006.01)

(52) U.S. Cl. .................. 429/231.95; 429/221; 429/223; 429/231.5; 423/306

(58) Field of Classification Search .................. 429/221, 429/231.95, 231.5, 223; 423/306
  See application file for complete search history.

(56) References Cited

U.S. PATENT DOCUMENTS 6,017,654 A    1/2000  Kumta et al. ........... 429/231.95
6,702,961 B2   3/2004  Barker et al. ............. 252/518.1
6,727,017 B1   4/2004  Chang et al. ................. 429/144
2005/0244321 A1  11/2005  Armand et al. ............. 423/306

OTHER PUBLICATIONS

Implications of Reaction Mechanism and Kinetics on the Synthesis of Stoichiometric LiNiO$_2$, Feb. 7, 2002.
Influence of Crystallite Size on the Electrochemical Properties of Chemically Synthesized Stoichiometric LiNiO$_2$, Jul. 16, 2002.
Effect of Magnesium Substitution in Lithium Nickel Oxide, Oct. 28, 2004.
Synthesis and electrochemical characterization of LiMO$_2$ (M=Ni, Ni$_{0.75}$Co$_{0.25}$) for rechargeable lithium ion batteries, Jun. 4, 1998.
Theoretical X-ray Powder Diffraction Pattern for LiNiO$_2$, 1998.

*Primary Examiner*—Patrick Ryan
*Assistant Examiner*—Thomas H. Parsons
(74) *Attorney, Agent, or Firm*—Kratz, Quintos & Hanson, LLP

(57) ABSTRACT

A family of Li-ion battery cathode materials and methods of synthesizing the materials. The cathode material is a defective crystalline lithium transition metal phosphate of a specific chemical form. The material can be synthesized in air, eliminating the need for a furnace having an inert gas atmosphere. Excellent cycling behavior and charge/discharge rate capabilities are observed in batteries utilizing the cathode materials.

10 Claims, 19 Drawing Sheets

CATHODE MATERIAL FOR LI-ION BATTERY APPLICATIONS

FIELD OF THE INVENTION

The present invention is concerned with a family of novel cathode materials and a unique processing method for the materials synthesis for Li-ion batteries.

BACKGROUND OF THE INVENTION

Stoichiometric $LiFePO_4$ cathode material has been discussed for replacing $LiCoO_2$ type cathode material for lithium ion application because of the potentially lower cost (Fe replacing Co) and the safer operating characteristics of the material (no decomposition of the material during charging). However, present processing issues make the stoichiometric $LiFePO_4$ material expensive and difficult to produce. Presently, $LiFePO_4$ materials suitable for lithium ion battery applications require the synthesis utilizing high temperature heat treatment (>600° C.) under an inert atmosphere. Also, in order to increase the conductivity of the material, electrically conductive carbon is usually used for enhancing the conductivity and therefore the electrochemical properties of the synthesized material. The use of the inert atmosphere is a key factor that assures the good quality of the materials because of its importance in relation to residual carbon in the material. None of the prior art teaches how to synthesize $LiFePO_4$ material in air, without a protective atmosphere, and how to provide good conductivity of the material and thus good electrochemical properties of a cathode formed of the material.

It is known to use olivine structured material to be the active material for a battery cathode, such as in U.S. Pat. No. 5,910,382. Also U.S. Pat. Nos. 6,723,470, 6,730,281, 6,815,122, 6,884,544, and 6,913,855, in general, teach methods and precursors utilized for the formation of stoichiometric $LiFePO_4$, or the substitution of cations for Fe. The above publications only show how stoichiometric olivine structured materials having different cation substitutions are synthesized. None of the prior art teaches how to synthesize phosphate materials having a defective crystalline structure, in air, which have consistent good electrochemical properties for use as an active material in a cathode of a Li-ion battery.

In general, defects in the crystalline structure of a material can affect the electrochemical property of the synthesized material drastically. A classical example is the synthesis of stoichiometric $LiNiO_2$. A deficiency of lithium would lead to Ni mispositioned on the Li sites therefore retarding the diffusivity of Li drastically and causing the loss in capacity at certain rates. The influence of electrochemical properties caused by misposition of Ni on Li sites has been studied by Chang et al. (Solid State Ionics, 112 (1998) 329-344), which is hereby incorporated herein by reference. Additionally, the concentration of the defects can be affected by different processing precursors and processing protocols. For example, a solution processed precursor would in general possess higher reaction kinetics compared to conventional solid state processes and therefore exhibit lower defect concentration. The reason could be attributed to the fact that $LiNiO_2$ undergoes a decomposition reaction that causes loss of Li during heat treatment. As a result, proper precursors that render high formation kinetics would thus decrease the defect concentration of the synthesized material (Chang et al., Journal of the Electrochemical Society, 149 (2002) A331-A338; 149 (2002) A1114-A1120), which is hereby incorporated herein by reference. In the present example, although defects can physically retard the diffusivity of Li, the electronic structure of the material could also be affected by the presence of defects and thus the electrical conductivity of the resultant material. It is thus shown that factors such as precursors, processing environment, processing protocols and the kinetics of the reaction to the materials would affect defect concentration and the properties of the resulting material. In the present invention, a family of defective lithium transition metal phosphate material that can be synthesized at low temperature in air atmosphere possessing excellent rate and cycling capability is created. The formation of defects is caused by incorporating various lithiated transition metal oxides with distinct stoichiometry.

OBJECTS OF THE INVENTION

It is an object of the present invention to produce a new family of defective lithium transition metal phosphate based cathode material without the need for using a furnace having an inert gas atmosphere.

It is an object of the present invention to provide a method for producing a defective lithium transition metal phosphate based cathode material without the need for using a furnace having an inert gas atmosphere.

It is a further object of the present invention to provide a method of production which is easily scaled-up for commercial applications.

It is still a further object of the present invention to provide a method of production to consistently produce a cathode material having excellent cycling behavior and charge/discharge rate capabilities in a battery fabricated from the cathode material.

SUMMARY OF THE INVENTION

The present invention is focused on the development of a family of defective lithium transition metal phosphate that can be easily synthesized in air atmosphere at low temperature meanwhile possessing excellent consistency, rate capability and cyclability. The method includes, a) providing a crystalline lithium transition metal oxide (layer structured or spinel structured), b) providing an intermediate as-synthesized material consisting starting chemicals of Li:Fe:P:C in molar ratios of 1:1:1:2, c), combining and milling the above materials so as to form a mixture of the materials in particulate form, and d) heating the material of step c) to form a cathode material of defective lithium transition metal phosphate crystalline. The heating is carried out in a vessel in air and surfaces of the material facing the air are covered by a layer of inert blanket which is porous to air and escaping gases caused by the heating.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION OF THE INVENTION

Figure 1:
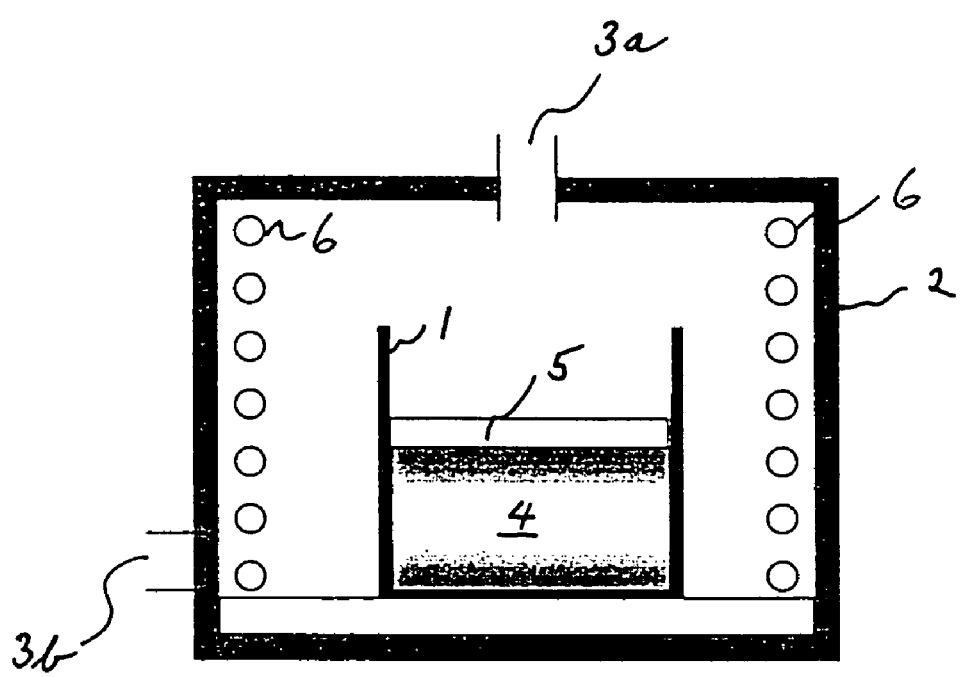
FIG. 1 is a cross-sectional view of a furnace reaction vessel and an inert blanket for use in synthesizing the material of the invention.

FIG. 1 shows the design of a furnace and a heat treatment environment for the synthesis of the materials presently disclosed. FIG. 1 shows reaction vessel 1, which is open to air in furnace 2. The furnace is open to the atmosphere at 3a and 3b so as to maintain substantially atmospheric pressure in the furnace. Flow of gases into or out of the furnace is dependent on heating and cooling cycles of the furnace and chemical reactions taking place with materials in the furnace. Air is free to enter the furnace, and air and/or products of a chemical reaction of materials 4 in the reaction vessel 1 are free to exit the furnace. Materials 4 in vessel 1 react chemically during heating steps to form cathode materials of the invention. Materials 4 in vessel 1, which face air found in the furnace, are covered by a layer of a high temperature inert blanket 5, which is porous to air and escaping gases caused by the heating step. Heating coils of the furnace are indicated at 6.

In the present invention, $Fe_2O_3$, $Li_2CO_3$, and $H_3PO_4$ are particularly chosen as the starting materials for the synthesis of lithium transition metal phosphate. Reasons for the choice include a relatively low cost of the starting material and a chemical reaction that releases $CO_2$ and $H_2O$, that is: $Fe_2O_3 + Li_2CO_3 + 2H_3PO_4 + \frac{1}{2}C \rightarrow 2\ LiFePO_4 + 3/2CO_2 + 3H_2O$. The released gas by-products during reaction can permeate through the porosity of the high temperature inert and porous blanket.

Stoichiometric $LiFePO_4$ is conventionally known as the "active material" in a cathode for use in a Li-ion battery. However, it has been found that the electrical conductivity of stoichiometric $LiFePO_4$ is not good and the performance of the battery can be improved with the presence of a material having good electrical conductivity along with the $LiFePO_4$ Carbon is known to be a good material for improving the electrical conductivity of the cathode. It is known to provide an amount of C in the starting material of the above-reaction, which is greater than the stoichiometric amount, so as to provide a residual amount of C with the produced stoichiometric $LiFePO_4$ cathode material. However, for the reaction to take place at a rate which is reasonable for commercial production, a temperature of about 600° C. or more is required. At such temperature, decomposition of carbon (for example carbon black) can take place, and the amount of residual C cannot be well controlled. It is known to carry out the synthesis in a controlled inert atmosphere, however commercially producing the material in such a manner adds substantial cost to the production. In the present invention a method has been found to produce a family of novel cathode materials without the use of the above-described controlled atmosphere equipment and process.

In the present invention, a method is provided for making defective lithium transition metal phosphates having a defective crystalline structure that does not require high temperature heat treatment as well as inert atmosphere condition. The way to create the defective structure is to dissolve other lithiated materials with different stoichiometry into a $LiFePO_4$ structure. The chemistry is proposed as follows:

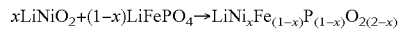

$$xLiNiO_2 + (1-x)LiFePO_4 \rightarrow LiNi_xFe_{(1-x)}P_{(1-x)}O_{2(2-x)}$$

In this case, P and O are deficient and some vacancies would form as indicated by the subscripts shown for P and O. Or,

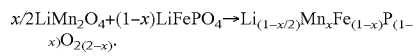

$$x/2Li Mn_2O_4 + (1-x)LiFePO_4 \rightarrow Li_{(1-x/2)}Mn_xFe_{(1-x)}P_{(1-x)}O_{2(2-x)}.$$

In this case, Li and P and O are deficient and some vacancies would form in the similar way as mentioned in the previous reaction. The reactions proposed are just utilized in explaining the occurrence of defective structured material. However, in the present invention, the target is not to synthesize stoichiometric $LiFePO_4$. As a result, the layer structured or spinel structured lithium transition metal oxides are reacting with an intermediate as-synthesized material that has a molar ratio of Li:Fe:P:C=1:1:1:2.

In order to facilitate the formation of the above-mentioned defective materials in normal air environment, low temperature heat treatment is utilized for the synthesis. The meaning of low temperature implies just enough temperature for the formation of desirable material. In the present invention, the temperature is chosen to be between 550 to 650° C., preferably at 600° C. Too high of a temperature not only increases energy consumption, but also increases the difficulties in maintaining the consistency of the synthesized material.

Features of the present invention include:
A. No use of an inert atmosphere: This feature results in:
  i. Easy scale up for production.
  ii. Much lower cost of a furnace since a gas-tight furnace becomes unnecessary. Also, the cost of inert gas can be saved.
  iii. Overall cost of the synthesis protocol is reduced.
  iv. Easy control of the quality of the resultant materials.
B. Good performance of the synthesized material: Excellent cycling behavior (cycle life) and rate capability (>20C of rate capability) are achieved as will be described in detail in the examples below.
C. Consistency in performance: This is extremely important for the synthesis of the material since the consistency of the performance is extremely important for battery applications. Owing to the formation of the defective crystalline structured material, not only the conductivity of the as-synthesized material is enhanced, but also the batch to batch consistency of the as-synthesized materials is obtained, especially when heat treated in an air environment.

The choice of a low temperature heat treatment can minimize the possibility of decomposition of the desirable defective material. Besides, lower temperature heat treatment (lower than the decomposition temperature of carbon black at ~600° C.) can also reduce the variations of residual carbon content and distribution during the heat treatment. It should be noted that although variations in the carbon content of the final product in the present invention is not as important as in prior art materials, owing to the high electrical conductivity of the defective material, low temperature heat treatment is still recommended for minimizing unnecessary variations.

In the present invention the purpose of adding layer structured or spinel structured materials during synthesis is to create a defective crystalline structure of the resultant material. The importance of the creation of defective crystalline structure is to promote the occurrence of the change of band structure and thus the electrical conductivity of the resultant material. An earlier publication by the present inventor using a computational method, pointed out that the electrochemical property of the material could be influenced significantly by the anions (Chang et al., Journal of the Electrochemical Society, 151 (2004) J91-J94), which is hereby incorporated herein by reference. Because of the above-described enhancement of electrical conductivity of the defective material, the use of excess carbon and the existence of carbon content in the resultant material become unimportant or unnecessary.

In the present invention a new family of defective crystalline structure lithium metal phosphate materials, that can be obtained using an air environment heat treatment, is provided. Excellent electrochemical properties are exhibited. The high rate capability has been demonstrated to be more than 20C.

Following are examples of cathode materials, both prior art materials and cathode materials of the invention.

EXAMPLE 1

Synthesis of Conventional Stoichiometric LiFePO$_4$ using Excess Carbon under Inert Atmosphere Fe$_2$O$_3$ and Li$_2$CO$_3$ and Super P (carbon black), molar ratio of (1:1:2) were mixed together with the addition of a suitable amount of water to produce a slurry. After mixing thoroughly, the proper Stoichiometric amount of phosphoric acid was added in the solution and extended mixing was utilized. Finally, the slurry was dried in air at 150° C. for 10 hours followed by further heat treatment at 400° C. for 5 hours until chunks of materials were obtained. The as-prepared material was then subjected to grinding and ball milling for about 12 hours.

Heat treatment for synthesis was conducted in a sealed metallic box with the flow of nitrogen gas. The materials were heat treated at 650° C. for 10 hours under the nitrogen gas flow.

Figure 2:
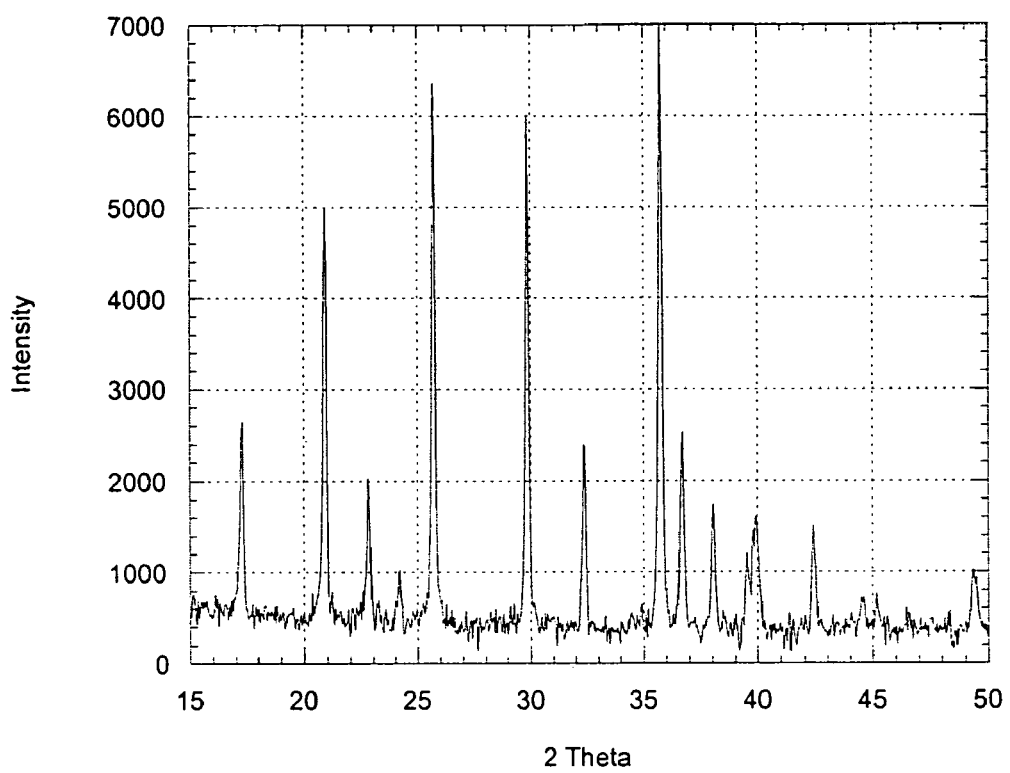
FIG. 2 is an x-ray diffraction (XRD) pattern for conventional $LiFePO_4$ cathode material of Example 1.
Figure 3A:
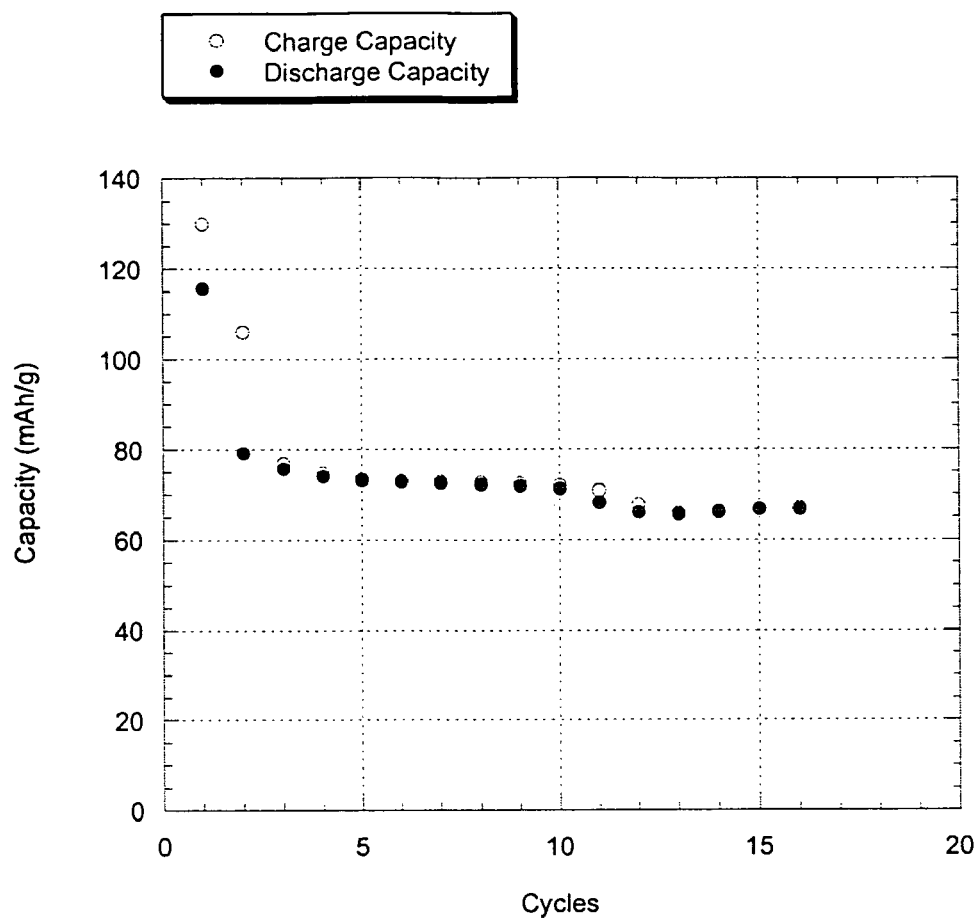
FIGS. 3(a) and 3(b) are graphs for showing the cycling behavior of a test battery fabricated from the cathode material of Example 1.
Figure 3B:
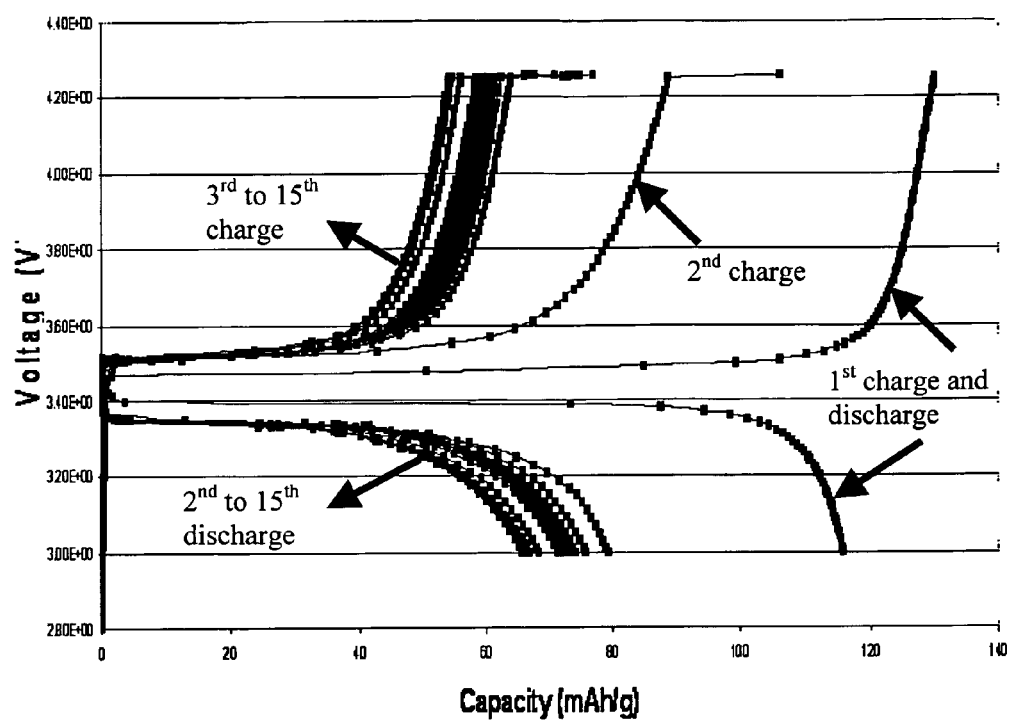

XRD data is shown in FIG. 2. It is observed that phase pure material can be obtained using the described conventional heat treatment protocol. Battery data (obtained using a three electrode design test battery and lithium as the reference electrode) is shown in FIG. 3. From FIG. 3($a$) it can be seen that the capacity is high during the first charge-discharge cycle (~C/5 rate, 0.23 mA/cm$^2$). The cycles following the first cycle were tested using ~2C test conditions (2.3 mA/cm$^2$ in constant current charge and discharge, with constant voltage charge to current <200 uA during the charge step). From FIG. 3($b$) it can be observed that the cycle life was not good. The capacity fades from (~80 mAh/g to ~65 mAh/g after 15 cycles). The fade in capacity is an indication of insufficient electrical conductivity of the material that can not sustain high current cycling and thus fade in capacity results during cycling. This result is consistent with the prior art disclosed in U.S. Pat. No. 6,723,470.

EXAMPLE 2

Synthesis of LiNi$_{0.92}$Mg$_{0.08}$O$_2$

Stoichiometric amounts of LiOH, H$_2$O, Ni(OH)$_2$ and Mg(OH)$_2$ were mixed in a blender. After 3 hours of mixing, the as-mixed precursor materials were subjected to heat treatment in air at 600° C. for 10 hours. After gentle crushing and sieving, the materials were then heat treated again in oxygen at 700° C. for 24 hours.

Figure 4:
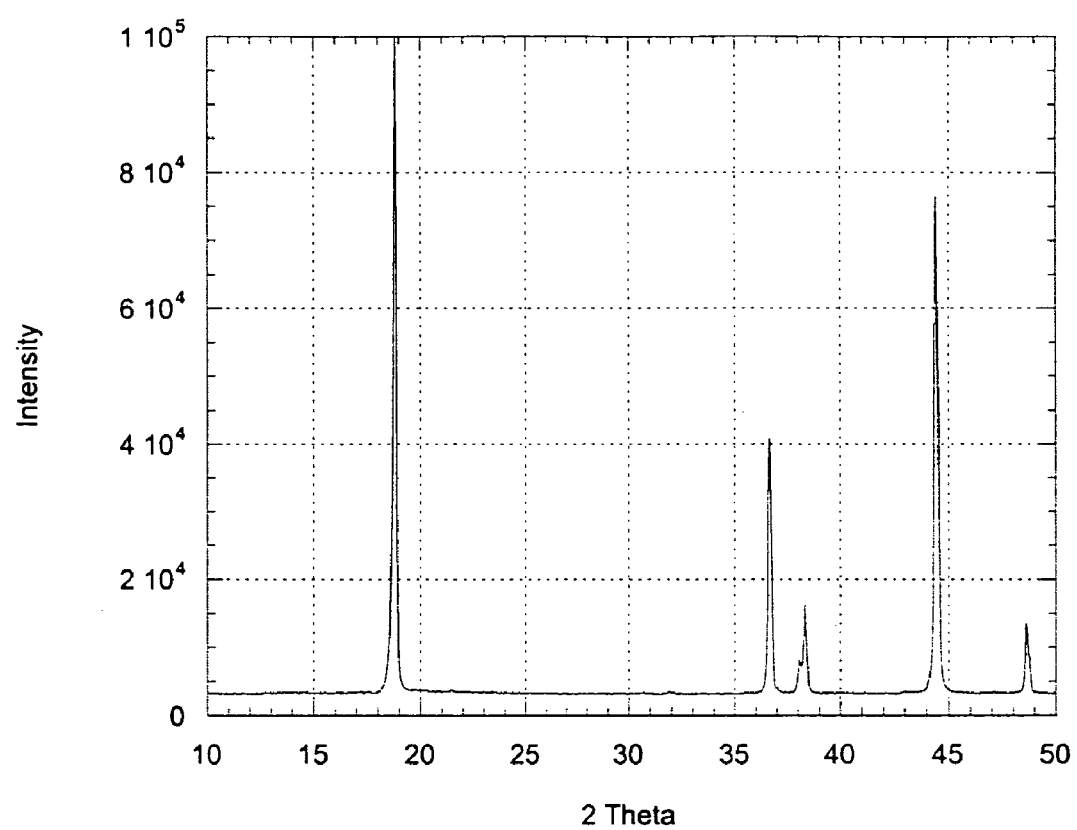
FIG. 4 is an XRD pattern for the $LiNi_{(0.92)}Mg_{(0.08)}O_2$ cathode material of Example 2.

An XRD pattern of the as-synthesized materials is shown in FIG. 4. From FIG. 4 it can be seen that the as-synthesized material is phase pure in nature. This suggests that all Mg cations are dissolved in the LiNiO$_2$ structure. According to the inventor's earlier publication referred to above, the Mg cations are substituting at the transition metal sites.

EXAMPLE 3

Synthesis of Defective Lithium Transition Metal Phosphate Obtained by Incorporating 3 wt % of LiNi$_{0.92}$Mg$_{0.08}$O$_2$ and Heat Treating in an Air Environment Fe$_2$O$_3$, Li$_2$CO$_3$ and Super P (carbon black), molar ratio of (1:1:2) were mixed together with the addition of a suitable amount of water to produce a slurry. After mixing thoroughly, a stoichiometric amount of phosphoric acid was added to the mixture and extended mixing was utilized. Finally, the slurry was dried in air at 150° C. for 10 hours followed by further heat treatment at 400° C. for 5 hours until chunks of material were obtained. The as-synthesized intermediate material was then subjected to grinding and ball milling with 3 wt % of LiNi$_{0.92}$Mg$_{0.08}$O$_2$ prepared as described in EXAMPLE 2, for about 12 hours.

Synthesis of the material was carried out by heat treatment at 600° C. for 10 hours in the furnace shown in FIG. 1, under air atmosphere.

Figure 5:
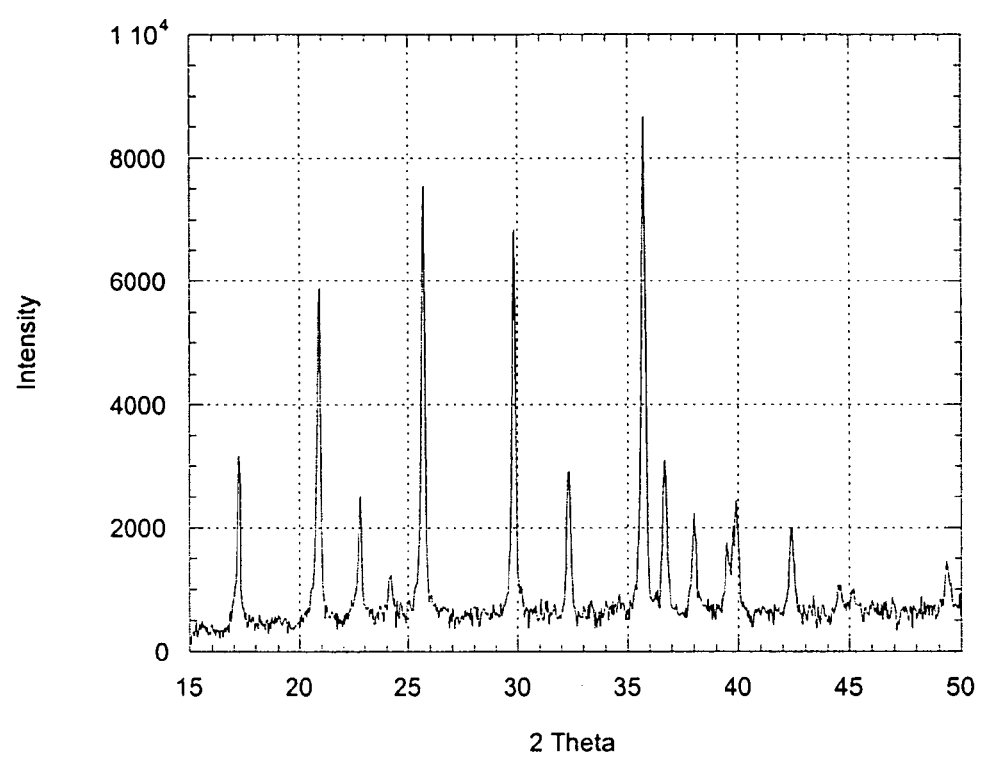
FIG. 5 is an XRD pattern for the defective crystalline lithium transition metal phosphate cathode material of Example 3.
Figure 6A:
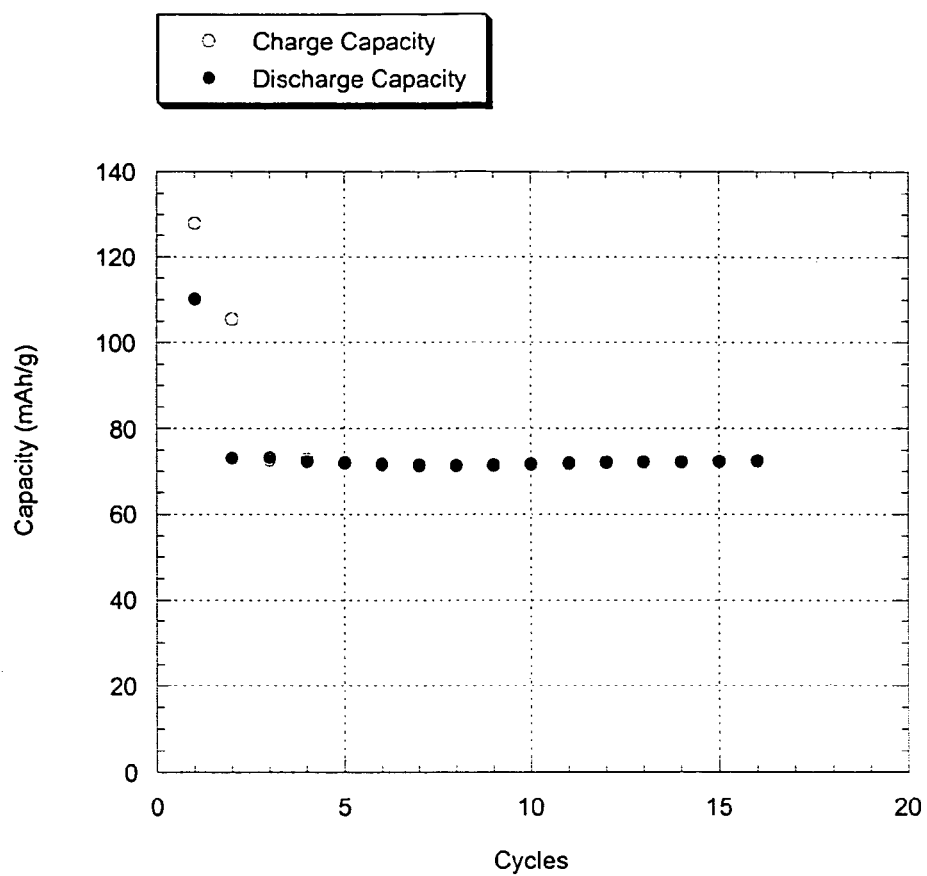
FIGS. 6(a) and 6(b) are graphs for showing the cycling behavior of a test battery fabricated from the cathode material of Example 3.
Figure 6B:
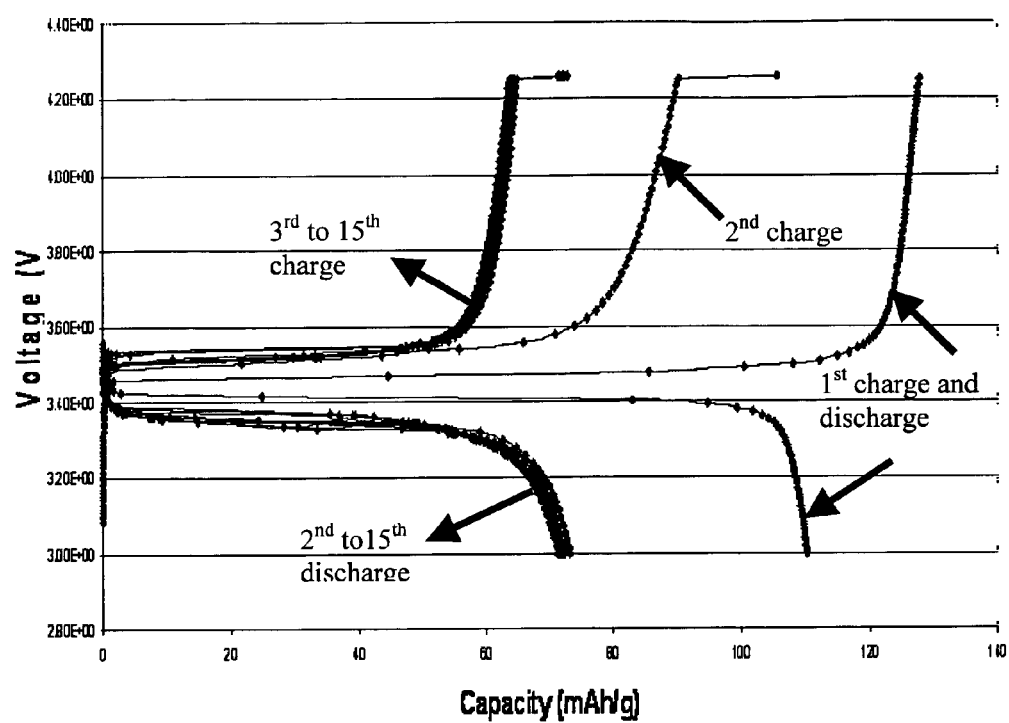

XRD data is shown in FIG. 5. The phase pure nature of the material synthesized is verified by comparing the present XRD data with the XRD data shown in FIG. 2. It is clear that a full dissolution of the layer structured LiNi$_{0.92}$Mg$_{0.08}$O$_2$ into the LiFePO$_4$ is possible. A full dissolution explains the formation of phosphorous and oxygen vacancies during processing. The electrochemical data is shown in FIGS. 6($a$) and 6($b$). From FIG. 6($a$) it can be seen that the cycling behavior is much improved compared to the data shown for EXAMPLE 1 in FIGS. 3($a$) and 3($b$). No fade in capacity was observed (see FIG. 6($b$)), as overlapping of cycling curves is observed. This result suggests that good electrical conductivity of the material is maintained throughout the cycling and thus the material has no fade characteristics. Aside from the improvement in cycling behavior, it is observed that the average discharge voltage has been increased from 3.28V to 3.33V at a 2 C discharge rate. This increase suggests that the defective crystalline material has distinct structure and property characteristics in comparison to the conventional stoichiometric LiFePO$_4$. Further supportive evidence is presented in EXAMPLES 6 and 7.

EXAMPLE 4

Fabrication of a 1.5 Ah Battery using the Material of the Invention Synthesized in Example 3

Cathode preparation: 5 wt % of Super P (500 g) and 5 wt % (500 g) of PVDF were mixed thoroughly with 90 wt % (9 kg)

of the material of the invention using NMP as a solvent. After stirring and mixing for about 12 hours, a homogeneous slurry was obtained. The slurry had a viscosity of ~20,000 cp prior to coating. The slurry was coated on an aluminum foil using a comma coater. The coated film was dried at 140° C. for approximately 10 minutes in a convective furnace. Similarly, the other side of the aluminum foil was coated with the same material. After drying, the coated foil was subjected to rolling. The resulting compressed films and foil had a thickness of 160±5 um.

Anode preparation: 8 wt % of PVDF and 92 wt % of natural graphite material were mixed thoroughly using NMP as a solvent. After stirring and mixing for about 12 hours a homogeneous slurry was obtained. The slurry had a viscosity of ~15,000 cp prior to coating. The slurry was coated on a copper foil using a comma coater. The coated film was dried at 140° C. for approximately 10 minutes in a convective furnace. Similarly, the other side of the copper foil was coated with the same material. After drying, the coated foil was subjected to coating with a polymer solution as disclosed in the Applicant's earlier U.S. Pat. No. 6,727,017. The as-coated anode was subjected to rolling to a thickness of 210±5 um.

Battery assembly: A battery was made using 28 pairs of cathodes (4 cm×5 cm) and anodes (4 cm×5 cm). The electrodes were placed in an alternating sequence, as in ABABAB fashion. After soaking with an electrolyte (EC/DMC 1:1) for about 12 hours, the battery was subjected to cycling.

Table 1 shows the cycling behavior of the resultant battery. The battery shows a capacity of ~1200 mAh at a charge/discharge current of 1.5 A. The average voltage of the battery during charge/discharge is also shown in Table 1.

TABLE 1

CYCLING BEHAVIOR OF THE BATTERY OF EXAMPLE 5
Cycling Behavior During Formation Without Aging (4 cycles only)

| Cycle Number | Charge Capacity (Ah) | Discharge Capacity (Ah) | Charge Energy (Wh) | Discharge Energy (Wh) | Average Charge Voltage (V) | Average Discharge Voltage (V) |
|---|---|---|---|---|---|---|
| 1 | 1.2719 | 1.1872 | 4.5453 | 3.6899 | 3.57E+00 | 3.11E+00 |
| 2 | 1.1730 | 1.1676 | 4.1588 | 3.6294 | 3.55E+00 | 3.11E+00 |
| 3 | 1.1535 | 1.1549 | 4.0825 | 3.5912 | 3.54E+00 | 3.11E+00 |
| 4 | 1.1391 | 1.1505 | 4.0269 | 3.5791 | 3.54E+00 | 3.11E+00 |

The battery was subjected to a high rate capability test at >20 C as follows:

Test setup and configuration: 7 light bulbs (12V, 50 W for each bulb) were connected in series one voltage meter and one ampere meter for monitoring the voltage and current. Four of the batteries of Example 4 were also connected in series and a total voltage of 13.2V was obtained (prior to closing the circuit). On closing the circuit an initial ampere meter reading of <30 Amp and a voltage reading of 10.5V (a total of 315 W) was observed. After 10 seconds, the readings of the ampere meter dropped to 28 A and the voltage reading dropped to 10.2V (a total of 286 W). Thereafter, the readings remained stable for the next 20 seconds.

From the high rate discharge test results described above, it can be concluded that the batteries possessed a high rate capability with a discharge capability of >20 C (a 1 C rate is 1.5 A, 20 C rate is 30 A). This result is significant in revealing that a good cathode material is obtainable under air atmosphere, that possesses high rate capabilities. Potential uses of such batters are power tools, vehicles, and large-scale family use power batteries.

EXAMPLE 5

Additional Example showing the Synthesis of Defective Lithium Transition Metal Phosphate Obtained by Incorporating 10 wt % and 20 wt % of $LiNi_{0.92}Mg_{0.08}O_2$ and Heat Treating in an Air Environment The same processing protocols found in EXAMPLE 3 were utilized for the synthesis of defective lithium transition metal phosphate with additives of 10 wt % and 20 wt %, in place of 3 wt % of Example 3.

Figure 7A:
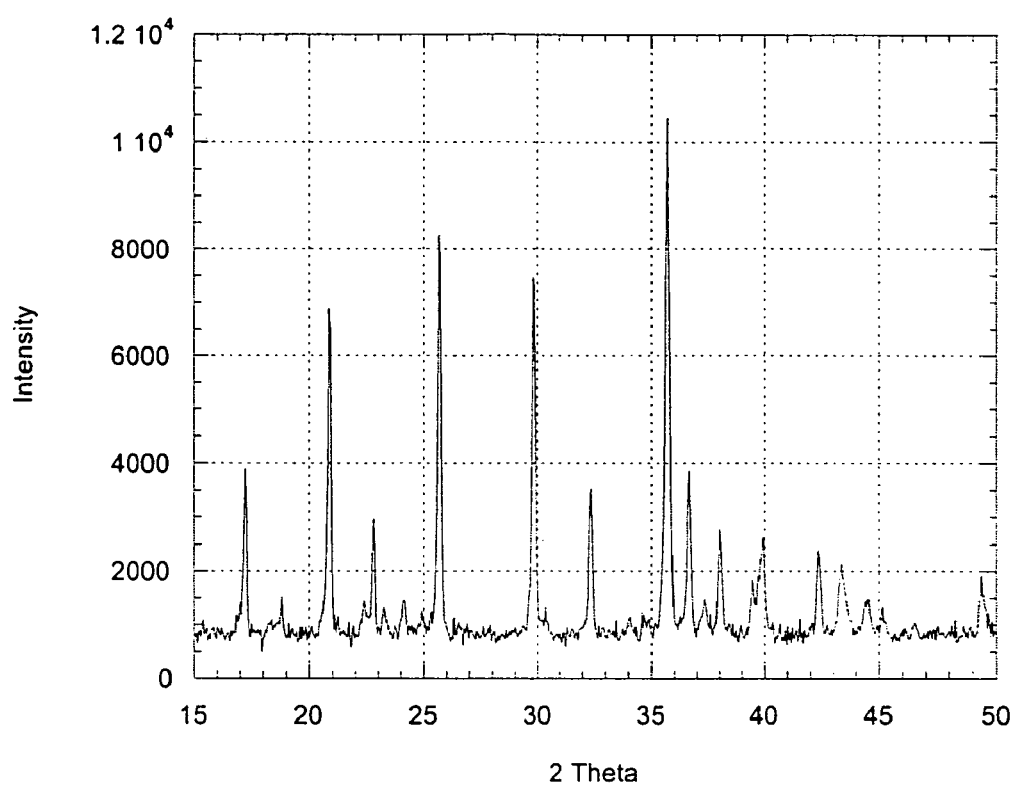
FIGS. 7(a) and 7(b) are XRD patterns for defective crystalline lithium transition metal phosphate having 10 wt % and 20 wt %, respectively, of $LiNi_{(0.92)}Mg_{(0.08)}O_2$ as shown in Example 5.
Figure 7B:
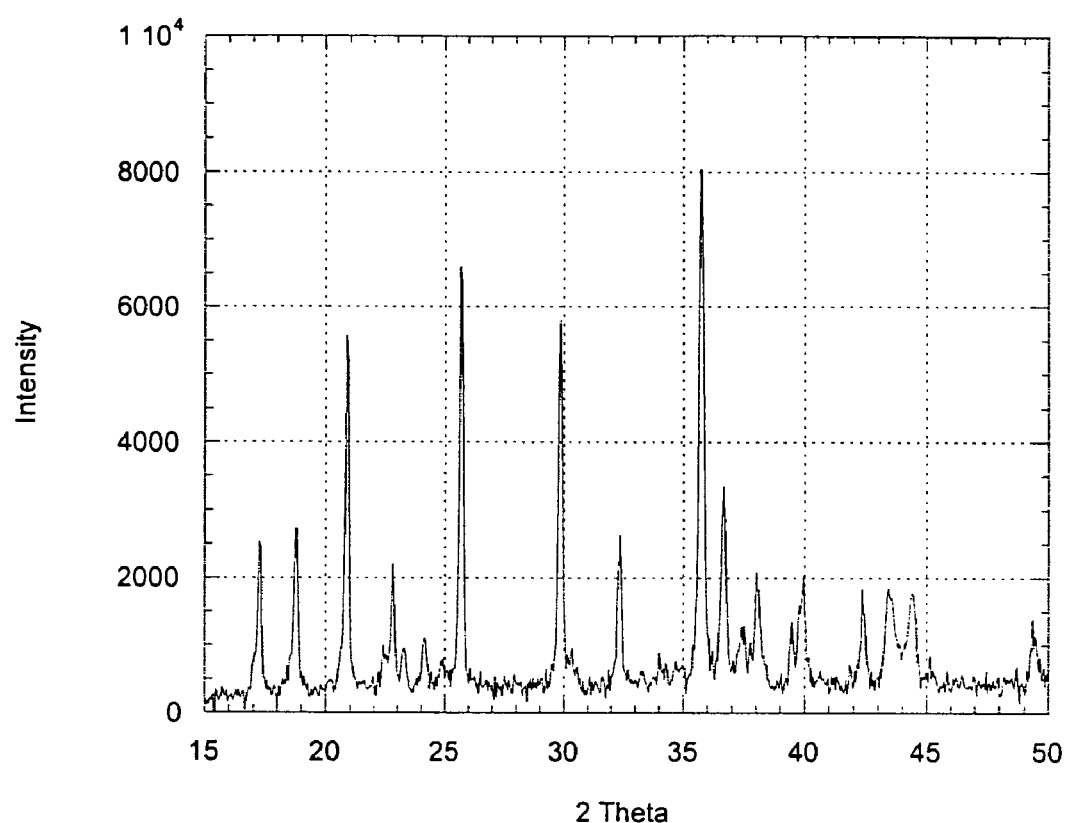
Figure 8A:
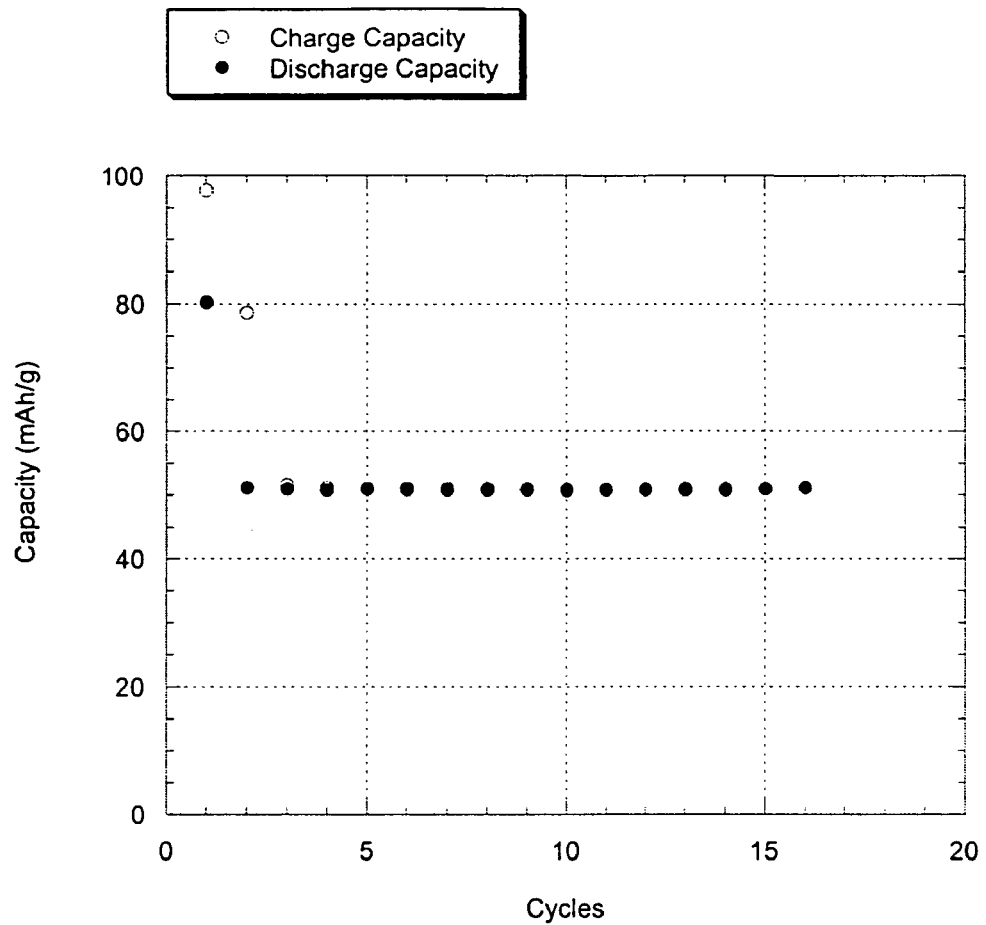
FIGS. 8(a) and 8(b) are graphs for showing the cycling behavior of a test battery fabricated from the cathode material of Example 5 having 10 wt % of $Li Ni_{(0.92)}Mg_{(0.08)}O_2$.
Figure 8B:
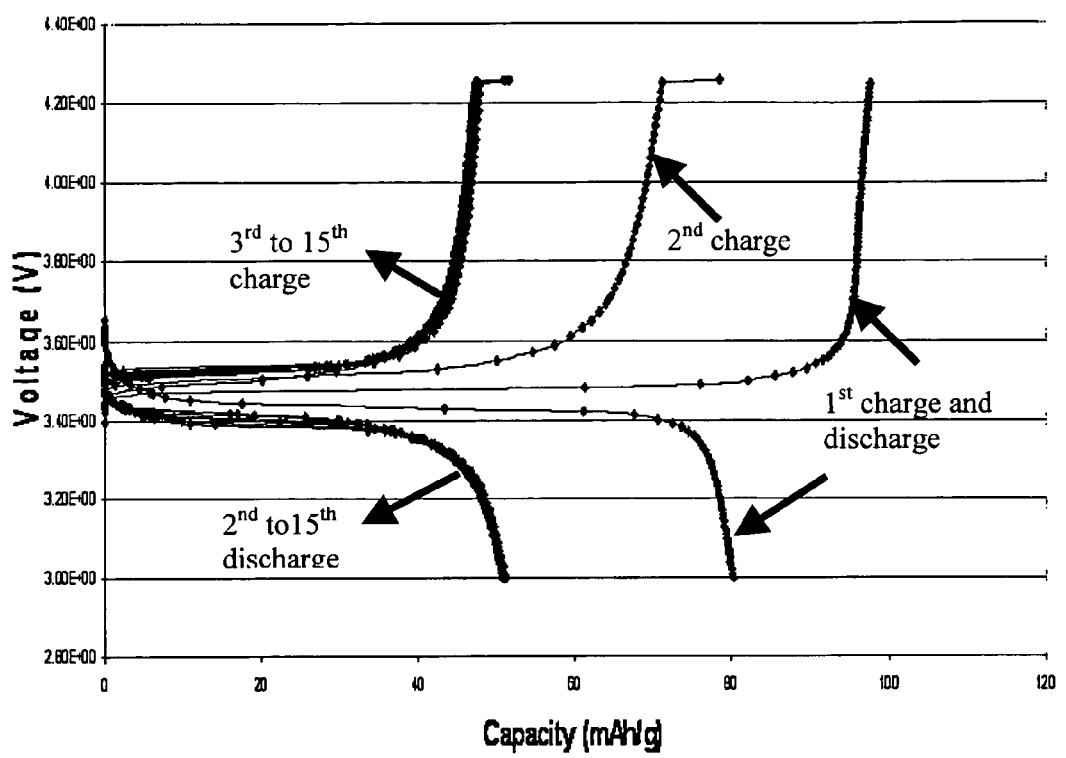
Figure 8C:
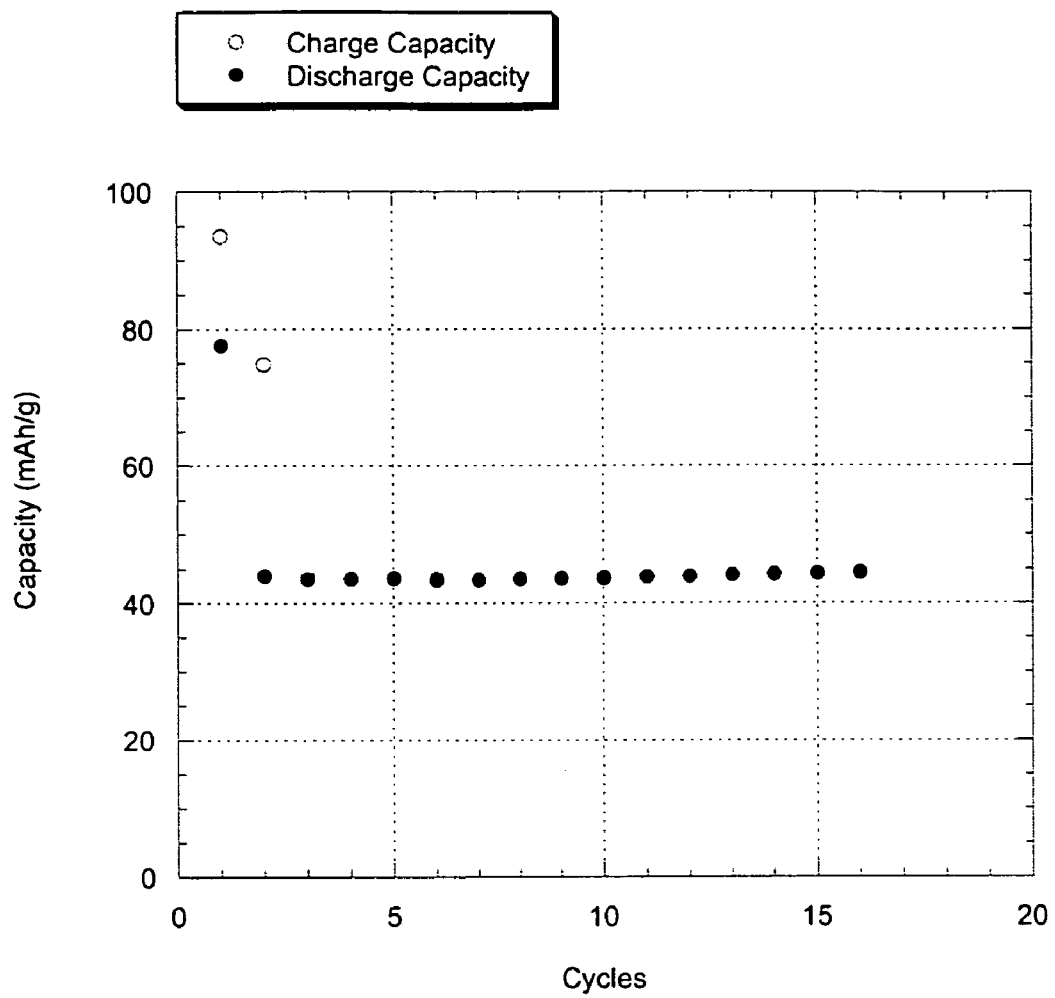
FIGS. 8(c) and 8(d) are graphs for showing the cycling behavior of a test battery fabricated from the cathode material of Example 5 having 20 wt % of $Li Ni_{(0.92)}Mg_{(0.08)}O_2$.
Figure 8D:
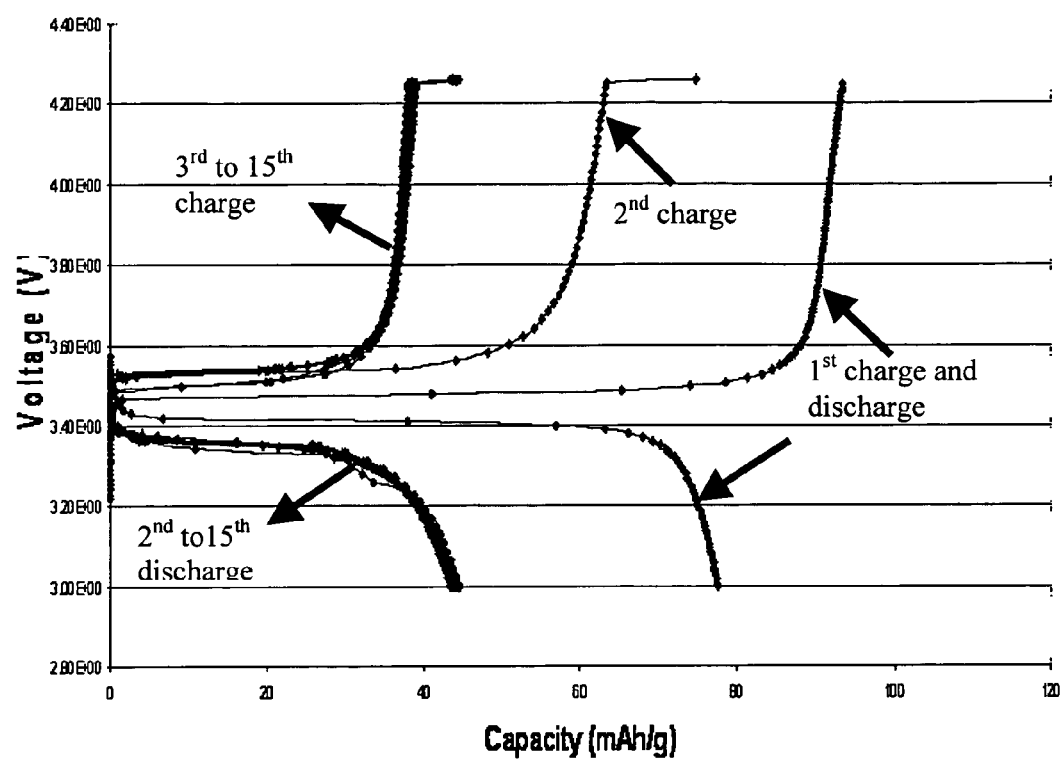

XRD data is shown in FIGS. 7(a) and 7(b). Stronger impurity phase patterns are observed for the 10 wt % and 20 wt % $LiNi_{0.92}Mg_{0.08}O_2$ added samples compared to the XRD data shown for pure $LiFePO_4$ and 3 wt % $LiNi_{0.92}Mg_{0.08}O_2$ incorporated material (FIGS. 2 and 5, respectively). This suggests that the existence of $LiNi_{0.92}Mg_{0.08}O_2$ during synthesis could result in some impurity phases including un-reacted $LiNi_{0.92}Mg_{0.08}O_2$ and partially dissolved material.

Electrochemical data is shown in FIGS. 8(a)-8(d). From FIG. 8 it can be seen that the cycling behavior is as good as the 3 wt % $LiNi_{0.92}Mg_{0.08}O_2$ incorporated material, although the capacity decreased from 75 mAh/g to 50~60 mAh/g range. It can be concluded that with the addition of more $LiNi_{0.92}Mg_{0.08}O_2$ material, although good electrical conductivity of the material is ensured, owing to the presence of the defective crystalline structure, with too much $LiNi_{0.92}Mg_{0.08}O_2$, addition or insufficient heat treatment time would lead to the existence of un-reacted $LiNi_{0.92}Mg_{0.08}O_2$ not possessing any capacity. As a result, for the purpose of good control of the performance of the defective lithium iron phosphate type material synthesized in an air environment, the proper amount of $LiNi_{0.92}Mg_{0.08}O_2$ should be added for achieving the best electrical conductivity and capacity of the material. The amount of $LiNi_{0.92}Mg_{0.08}O_2$ addition during synthesis is thus very important for obtaining the best electrochemical performance in a battery.

EXAMPLE 6

Figure 9A:
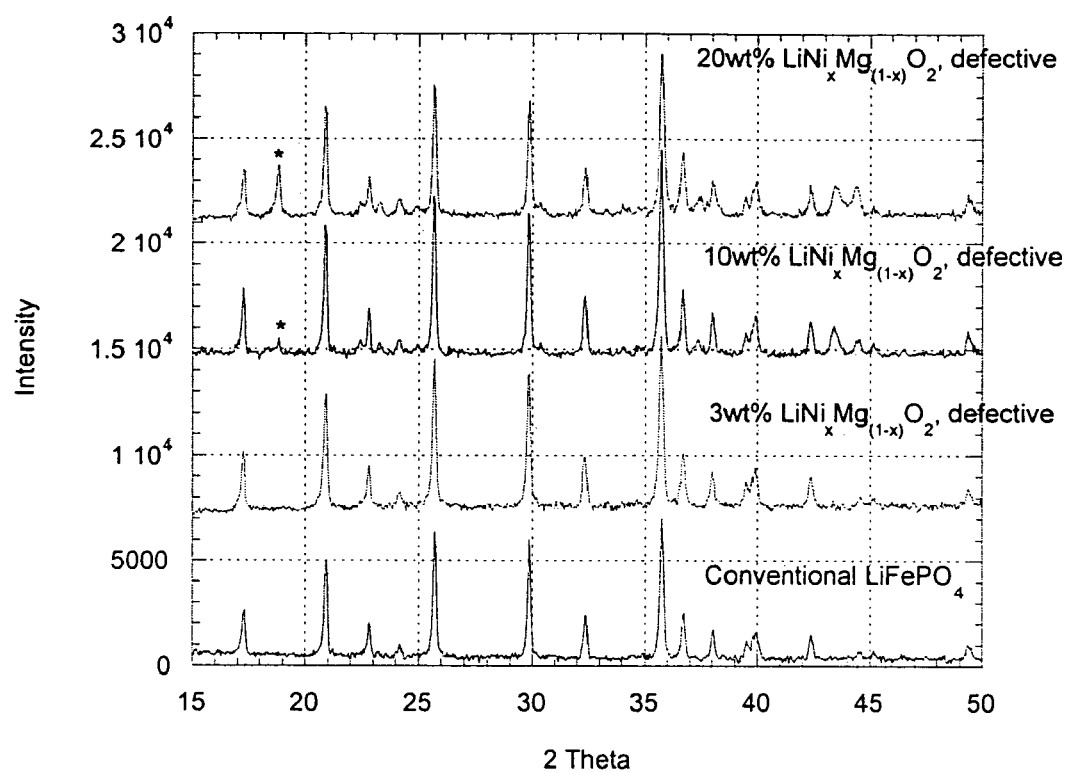
FIGS. 9(a) and 9(b) are stacks of XRD patterns for comparing peak intensity for various cathode materials found in examples described herein.

Comparative Study of Defective Lithium Transition Metal Phosphate (Resulting from Reactions with Different Amounts of $LiNi_{0.92}Mg_{0.08}O_2$), and $LiFePO_4$ Simply Mechanically Mixed with $LiNi_{0.92}Mg_{0.08}O_2$ to Different Weight Percentages FIG. 9(a) shows a stack of XRD patterns of the conventionally synthesized $LiFePO_4$ (prepared as shown in EXAMPLE 1), defective lithium transition metal phosphate having 3 wt % $LiNi_{0.92}Mg_{0.08}O_2$ (prepared as shown in EXAMPLE 3), defective lithium transition metal phosphate having 10 wt % and 20 wt % $LiNi_{0.92}Mg_{0.08}O_2$ (prepared as shown in EXAMPLE 5).

Figure 9B:
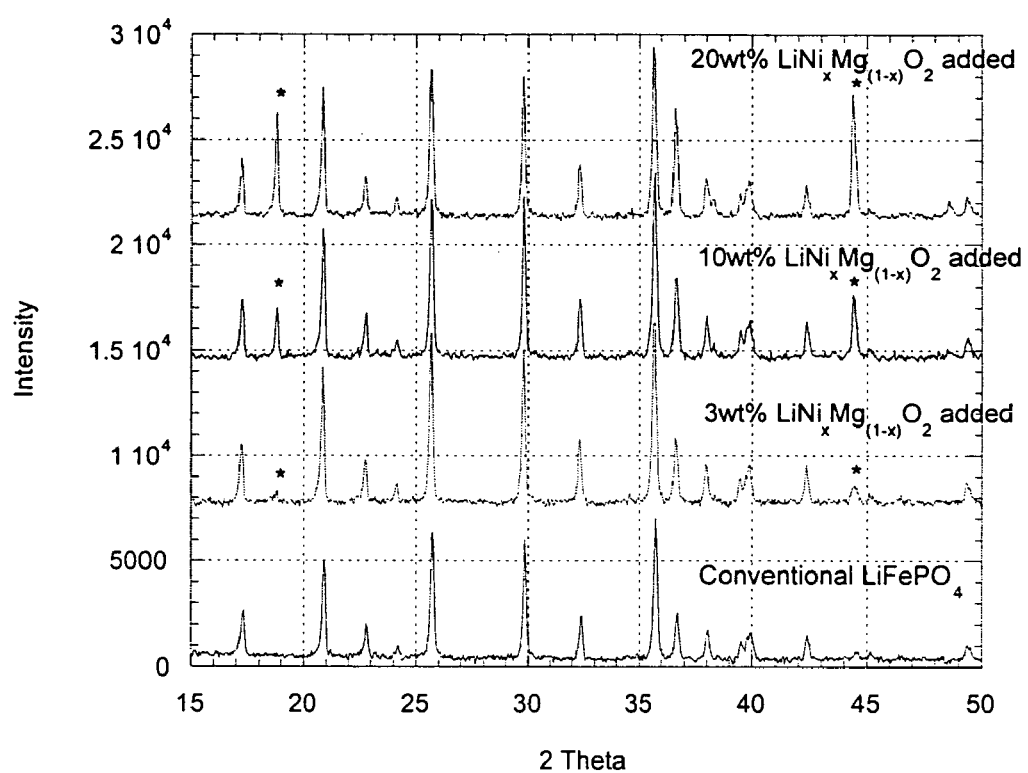

FIG. 9b shows a stack of XRD patterns of 0 wt %, 3 wt %, 10 wt %, and 20 wt % $LiNi_{0.92}Mg_{0.08}O_2$ simply mechanically added and mixed with conventional stoichiometric $LiFePO_4$. From FIG. 9(b) it can be seen that with a slight $LiNi_{0.92}Mg_{0.08}O_2$ addition (3 wt %), distinct $LiNi_{0.92}Mg_{0.08}O_2$ peaks can be observed (~18.6° for (003) and 44.4° for (104)). This result suggests that the phase pure nature of the 3 wt % $LiNi_{0.92}Mg_{0.08}O_2$ reacted sample (Example 3) is the result of total dissolution of $LiNi_{0.92}Mg_{0.08}O_2$ into the $LiFePO_4$ structure, therefore rendering the presence of phosphorous and oxygen vacancies as discussed. Also, with the same amount of $LiNi_{0.92}Mg_{0.08}O_2$ addition in either case, (material of FIG. 9(a) and material of FIG. 9(b)), the $LiNi_{0.92}Mg_{0.08}O_2$ added (un-reacted) sample always shows higher (003) and (104) peak intensity (~18.6° and 44.4°). This suggests that defective lithium transition metal phosphate is a consequence of reactions between the as-synthesized precursor materials (as described in EXAMPLE 3 and 5). The characteristics are distinct from material simply mechanically mixed with $LiNi_{0.92}Mg_{0.08}O_2$ to different weight percentages.

EXAMPLE 7

Chemical Analyses for Conventional $LiFePO_4$ (Material Made in EXAMPLE 1) and Defective Lithium Transition Metal Phosphate Synthesized by Incorporating 3 wt % $LiNi_{0.92}Mg_{0.08}O_2$ (Material made in EXAMPLE 3)

The chemical analysis results for both conventional $LiFePO_4$ (material made in EXAMPLE 1) and defective lithium transition metal phosphate incorporated with 3 wt % $LiNi_{0.92}Mg_{0.08}O_2$ (material made in EXAMPLE 3) are shown in Table 2. The calculated stoichiometry numbers for the two samples are obtained by converting the wt % to mol % for each element while setting the stoichiometry of Fe and (Fe+Ni+Mg) to unity. In the case of conventional $LiFePO_4$, the calculated stoichiometry ratio of Fe:P=1:0.9805. Similarly, the 3 wt % incorporated material possesses a stoichiometry ratio of Li:(Fe+Ni+Mg):P=1:0.9534. A deficiency of phosphorous supports the proposed formation of vacancies during the reaction. It should be noticed that the oxygen content can not be analyzed chemically. However, if we assume a 100 wt % of the sample being analyzed, the stoichiometric numbers for the 3 wt % incorporated material is still smaller than the conventional material. This is still consistent with the proposed oxygen vacancy formation during the synthesis.

TABLE 2

Chemical analyses for materials synthesized in EXAMPLE 1 and EXAMPLE 3*†

| Elements | Example 1 material | Mol fraction | Elements | Example 3 material | Mol fraction |
|---|---|---|---|---|---|
| Li (wt %) | 4.3 | 0.61951 | Li (wt %) | 4.14 | 0.59646 |
| Fe (wt %) | 32 | 0.57299 | Fe (wt %) | 31.0 | 0.55509 |
| P (wt %) | 17.4 | 0.56183 | P (wt %) | 17.3 | 0.55861 |
| C (wt %) | 5.7 | 0.47460 | C (wt %) | 4.45 | 0.37052 |
|  |  |  | Ni (wt %) | 1.67 | 0.028455 |
|  |  |  | Mg (wt %) | 0.57 | 0.00234 |
| Molar ratio of Fe:P | 1:0.9805 |  | Molar ratio of (Fe + Mg + Ni):P | 1:0.9534 |  |

*The Li, Fe, P, Ni, and Mg were analyzed using ICP-OES The C was analyzed using ASTM D5373
†The oxygen content can not be determined directly owing to the relatively high concentrations of metals.

EXAMPLE 8

Synthesis of Defective Lithium Transition Metal Phosphate Incorporated with Spinel Structured $Li_{1.07}Mn_{1.93}O_4$ (3 wt %) in Air Environment $Fe_2O_3$, $Li_2CO_3$ and Super P (carbon black), molar ratio of (1:1:2) were mixed together with the addition of a suitable amount of water. After mixing thoroughly, a stoichiometric amount of phosphoric acid was added to the solution and extended mixing was utilized. Finally, the slurry was dried in air at 150° C. for 10 hours followed by further heat treatment at 400° C. for 5 hours until chunks of materials were obtained.

$Li_{1.07}Mn_{1.93}O_4$ was synthesized using $Li_2CO_3$, and $Mn_3O_4$ with a stoichiometric ratio of Li:Mn of 1.1:2 in the precursor. The starting materials $Li_2CO_3$ and $Mn_3O_4$ were first mixed using a ball mill for 8 hours, followed by heat treating the material to 800° C. for 24 hours in air. The material obtained was then subjected to grinding and sieving.

The materials prepared above were then subjected to grinding and ball milling for about 12 hours with the amount of $Li_{1.07}Mn_{1.93}O_4$ being 3 wt %. Further heat treatment at 600° C. for 10 hours in the furnace shown in FIG. 1 under air atmosphere was conducted on the materials.

Figure 10:
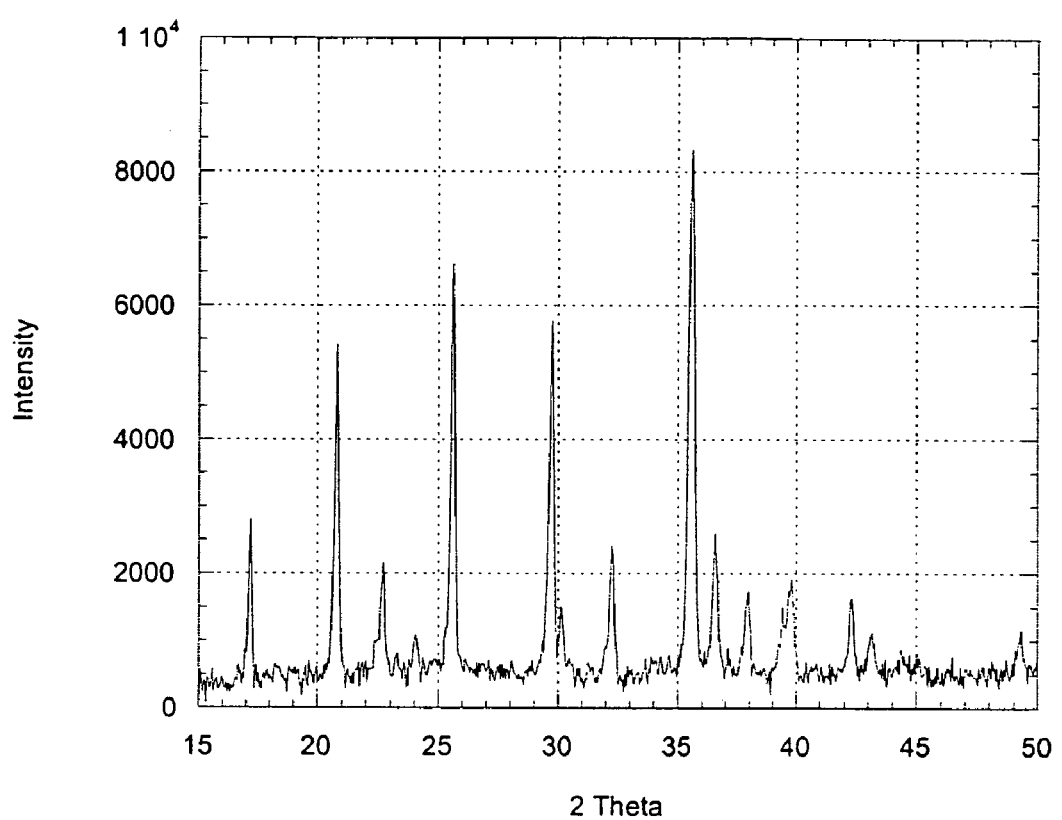
FIG. 10 is an XRD pattern for defective crystalline lithium transition metal phosphate created by dissolving 3 wt % of $Li_{(1+x)}Mn_{(2-x)}O_4$ as described in Example 8.
Figure 11A:
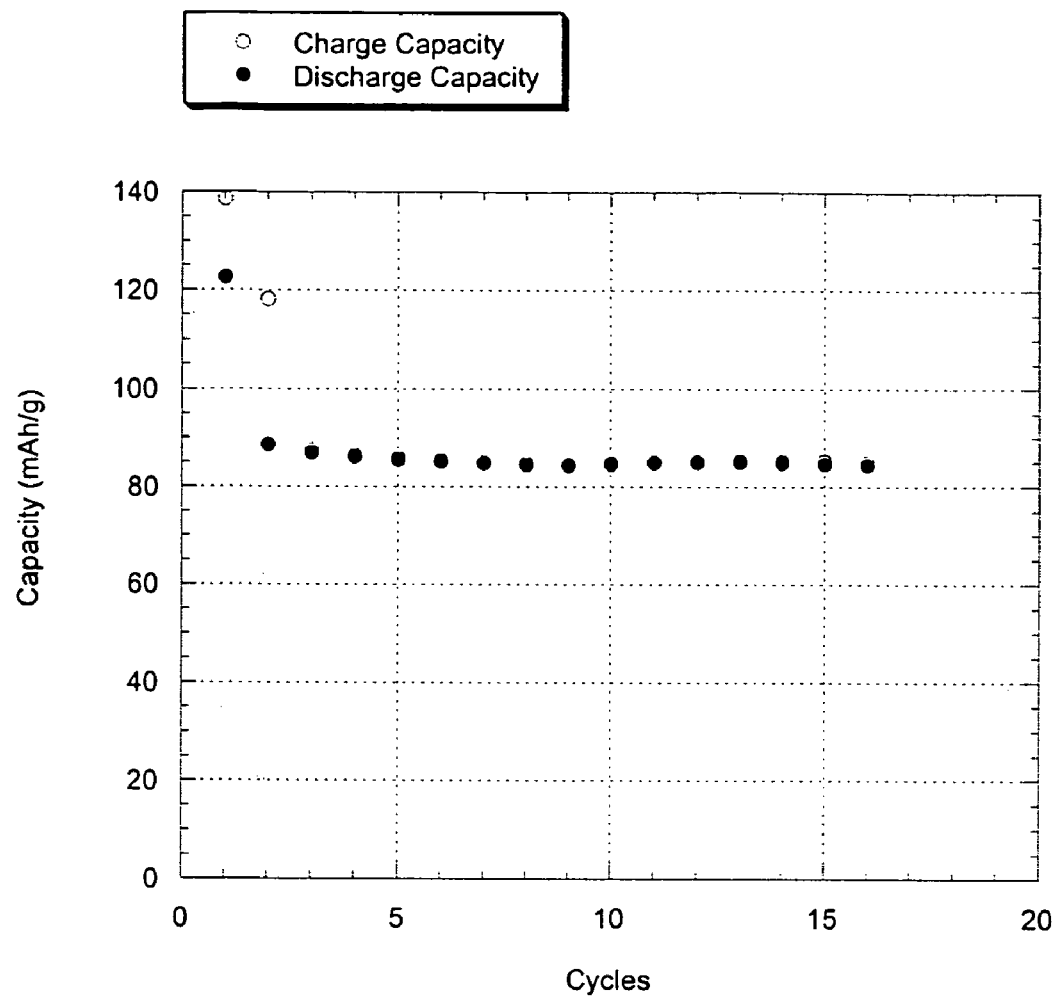
FIGS. 11(a) and 11(b) are graphs for showing the cycling behavior of a test battery fabricated from the cathode material of Example 8.
Figure 11B:
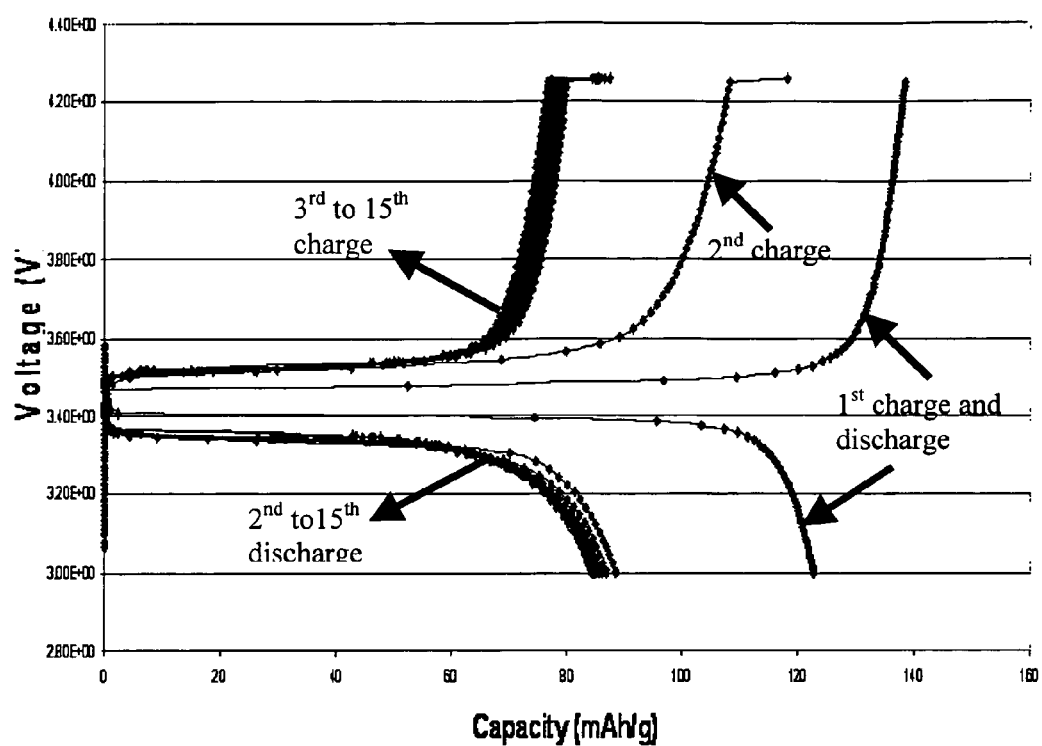

The XRD data is shown in FIG. 10. Slightly more impurity phases are observed compared to the XRD data shown for pure $LiFePO_4$ and 3 wt % $LiNi_{0.92}Mg_{0.08}O_2$ incorporated material. Electrochemical data is shown in FIGS. 11(*a*) and 11(*b*). From FIG. 11(*a*) it can be seen that the cycling behavior is much improved compared to the data shown in EXAMPLE 1. No fade in capacity was observed (see FIG. 11(*b*)), as overlapping of cycling curves is observed. This result suggests that good electrical conductivity of the material is maintained throughout the cycling and thus the material possesses no fade characteristics.

While specific materials, heat treatments, etc. have been set forth for purposes of describing embodiments of the invention, various modifications can be resorted to, in light of the above teachings, without departing from the Applicant's novel contributions; therefore in determining the scope of the present invention, reference shall be made to the appended claims.

What is claimed is:

1. A method for forming a cathode material for a lithium-ion battery, comprising the steps of
   a) providing a crystalline lithium transition metal oxide,
   b) providing starting chemicals of Li:Fe:P:C in a molar ratio of 1:1:1:2,
   c) combining and milling the materials of a) and b) so as to form a mixture of the materials of a) and b) in particulate form,
   d) heating the material of step c) to form a cathode material having a defective crystalline structure of crystalline $LiFe_{(1-x)}M_xP_{(1-x)}O_{2(2-x)}$ or $Li_{(1-x/2)}M_xFe_{(1-x)}P_{(1-x)}O_{2(2-x)}$, wherein
   $0.01 \leq x \leq 0.3$,
   M is one or more elements selected from the group of metals consisting of nickel, titanium, vanadium, chromium, manganese, iron, cobalt and aluminum, and
   said heating is carried out in a vessel in air; and surfaces of the material facing the air are covered by a layer of inert blanket which is porous that allows air permeation and escaping gases caused by said heating.

2. The method of claim 1, wherein
   the starting chemicals of step b) include $Fe_2O_3$, $Li_2 CO_3$, $H_3 PO_4$, and C, $Fe_2 O_3$ +$Li_2 CO_3$ and $H_3 PO_4$ are provided in stoichiometric amounts, and C is provided in an amount exceeding a stoichiometric amount.

3. The method of claim 1, wherein in step d) the materials are heated to a temperature of between 550° C. and 650° C. for a period of between 8 and 12 hours.

4. The method of claim 1, wherein step b) further includes, forming and mixing a slurry of the starting chemicals,
   drying the slurry,
   heating the dried slurry to obtain a product suitable for milling in step c).

5. The method of claim 4, wherein the slurry is dried in air at about 150° C. for about 10 hours, and the dried slurry is heated at about 400° C. for about 5 hours.

6. The method of claim 1, wherein
said crystalline lithium transition metal oxide has a general chemical formula of $Li Ni_{(x)}Mg_{(1-x)}O_2$ or $Li_{(1+x)} Mn_{(2-x)}O_4$, wherein $0 \leqq x \leqq 0.2$.

7. The method of claim 6, wherein
said crystalline lithium transition metal oxide is $Li Ni_{(0.92)}Mg_{(0.08)}O_2$ or $Li_{(1.07)}Mn_{(1.93)}O_4$.

8. The method of claim 1, wherein said blanket is a ceramic fiber blanket having a layer thickness of about 1-3 inches.

9. The method of claim 1, wherein in step d) the materials are heated to a temperature of about 600° C. for a period of about 10 hours.

10. The method of claim 1, wherein
the mixture of step c) contains 1-5 wt % of the crystalline lithium transition metal oxide.

* * * * *